350-332 SR
XR 3,976,994
1 X 5104N

United States Patent [19]
Washizuka et al.
[11] 3,976,994
[45] Aug. 24, 1976

[54] LIQUID CRYSTAL DISPLAY SYSTEM

[75] Inventors: Isamu Washizuka, Kyoto; Hirohide Nakagawa, Sakurai, both of Japan

[73] Assignee: Sharp Kabushiki Kaisha, Osaka, Japan

[22] Filed: Oct. 15, 1974

[21] Appl. No.: 514,928

[30] Foreign Application Priority Data

Oct. 15, 1973 Japan .............................. 48-116083

[52] U.S. Cl. .............................. 340/336; 350/160 LC
[51] Int. Cl.[2] .............................. G06K 15/18
[58] Field of Search ........... 340/336, 324 R, 324 M; 350/160 LC

[56] References Cited

UNITED STATES PATENTS

| | | | |
|---|---|---|---|
| 3,744,049 | 7/1973 | Luce | 340/324 R |
| 3,760,406 | 9/1973 | Walton | 340/336 |
| 3,809,458 | 5/1974 | Henner et al. | 350/160 LC |
| 3,863,221 | 1/1975 | Kaji | 340/324 M |

*Primary Examiner*—David L. Trafton
*Attorney, Agent, or Firm*—Stewart and Kolasch, Ltd.

[57] ABSTRACT

An improvement on a display system which displays multi-digit numeral information on a time-shared basis in response to application of bipolarity alternating voltage to liquid crystal display units. Each of the liquid crystal display units has a common electrode actuated by one of sequentially phase-shifted timing signals and a predetermined number of segment electrodes actuated by segment signals of which combinations are representative of the multi-digit numeral information to be displayed. Particularly, in the present system, visual display is provided over successive repetition of first and second display cycles in a manner that timing selection for the respective common electrodes is effected with one polarity or phase during the first display cycle and subsequently timing selection for the same is effected with the opposite polarity or phase during the second display cycle. This provides a considerable improvement in life time and immunity from blinking information caused due to the decreasing of display frequency.

5 Claims, 4 Drawing Figures

3976994
OR IN 340/336

LIQUID CRYSTAL DISPLAY SYSTEM

The present invention relates to a circuit system for driving a liquid crystal display panel and, more particularly, an improved circuit system which activates the same in a time-shared fashion upon application of alternating voltage.

An object of the present invention is the provision of a circuit system for the activation of a liquid crystal display panel utilizing as timing selection signals alternating voltage signals which alternate in phase or polarity each time a display cycle runs out, in order to provide not only long life but also immunity from the blinking of information being displayed.

The above and other objects and novel features of the present invention are set forth in the appended claims and the present invention as to its organization and its mode of operation will best be understood from a consideration of the following detailed description of the preferred embodiments when used in connection with the accompanying drawings.

Before discussing the liquid crystal driving techniques in accordance with the present invention, it may be of advantage to explain the generic concept of an explanatory one of various approaches proposed in the past. For example, a powerful approach has been discussed and shown in U.S. Pat. No. 3,898,646, issued Aug. 5, 1975 by Isamu Washizuka, one of inventors of this application, and Saburo Katsui, and assigned to assignee of this application.

Figure 1:
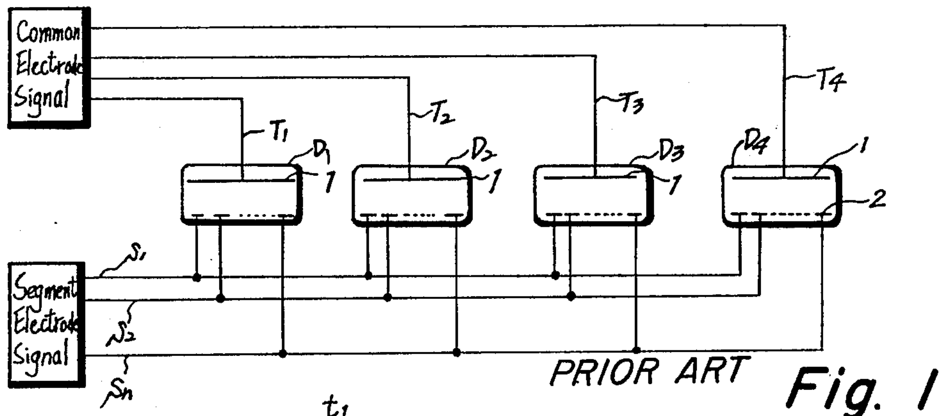
PRIOR ART Fig. 1
FIG. 1 is a schematic block diagram showing one of prior approaches to an economic and effective liquid crystal display system.
Figure 2:
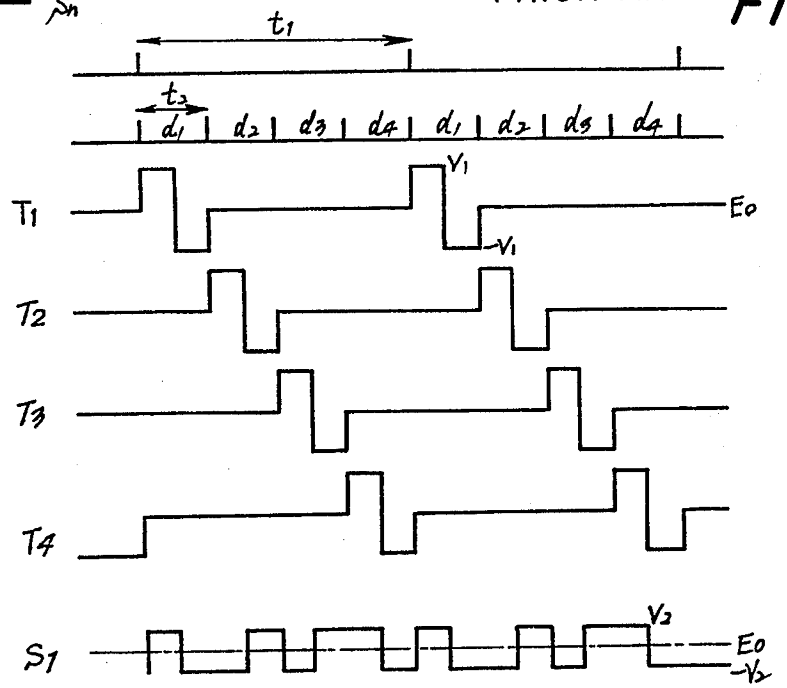
PRIOR ART Fig. 2
FIG. 2 is a timing chart showing various signals which occur in the system of FIG. 1.

More specifically referring to FIG. 1 and FIG. 2 illustrating the prior approach as set forth above, for example to display four-digit numeral information, alternating voltage of amplitude $|V_1|$ is supplied in sequence to respective common electrodes 1 for each repetition cycle. In these drawings $T_1$ designates one-word time period and $t_2$ designates one-digit time period which includes one complete cycle for the alternating voltage. Within segment electrodes 2 defining numeral patterns, the corresponding ones are connected to receive signals $S_1 - S_n$ which select as segmented configurations desired digits to be displayed.

For example, when it is desired to select and activate a certain segment $S_1$ of display units $D_2$ and $D_3$ in a total display system $D_1 - D_4$, the segment $S_1$ receives for only time periods $d_2$ and $d_3$ alternating voltage which is 180° out of phase with the signals supplied to the common electrodes and has an amplitude $|V_2|$ relative to a reference level $Eo$, whereas the same receives for non-selected time periods $d_1$ and $d_4$ alternating voltage which is in phase with the signals to the common electrodes and has the amplitude $|V_2|$ relative to the reference level $Eo$. Both selected electrodes cause the optical turbulence or light scattering state in the liquid crystal composition.

Under assumption that the liquid crystal is controlled by electronic techniques at the duty cycle of ¼ discussed above, voltage $|V_T|$ at which the human eye is capable of substantially recognizing a display subject in the light scattering state, will be higher than $|V_2|$. Otherwise or when $|V_T| \leq V_2$, the human eye can not recognize the scattering of light. Needless to say, this discrimination is not decided in a digital mode and, therefore, the amplitude $|V_1|$ of the alternating voltage signals $T_1 - T_4$ is selected at $|2V_2|$.

The following table sets forth the relationship between the alternating voltage to the common electrodes 1 and the segment electrodes 2 in the respective display units.

| display unit | time $d_1$ | $d_2$ | $d_3$ | $d_4$ |
|---|---|---|---|---|
| $D_1$ | $\pm V_2$ | $\mp V_2$ | $\mp V_2$ | $\pm V_2$ |
| $D_2$ | $\pm V_2$ | $\pm 3V_2$ | $\mp V_2$ | $\pm V_2$ |
| $D_3$ | $\pm V_2$ | $\mp V_2$ | $\pm 3V_2$ | $\pm V_2$ |
| $D_4$ | $\pm V_2$ | $\mp V_2$ | $\mp V_2$ | $\pm V_2$ |

In summary, the table shows that, in response to application of the signal $S_1$, the display unit $D_2$ provides the scattering of light at the time slot $d_2$ and then the display unit D3 provides the scattering of light at the time slot $d_3$, the remaining units $D_1$ and $D_4$ not being operative.

The scattering of light in the display units $D_2$ and $D_3$ occurs during the one digit period $t_2$ within the one-word period $t_1$ and thus at the repetition rate ¼. In the event that the repetition rate is considerably short, the human eye will be able to recognize uniformly and continuously the optical turbulence originated due to the scattering of light.

As will be clear from the foregoing discussion, the earlier approach filed in what is now U.S. Pat. No. 3,898,646 is advantageous as follows:

1. The alternating voltage is always applied to the liquid crystal whether or not the liquid crystal scatters light, thereby extending operating life of the liquid crystal.

2. Since the liquid crystal is controlled only by the absolute value of applied voltage regardless of the polarity thereof, the display system consisting of the liquid crystal units can be driven in a dynamic mode or time-shared mode by utilization of difference in potential of the signals to the both electrodes taking into account the phase relationship therebetween.

Figure 3:
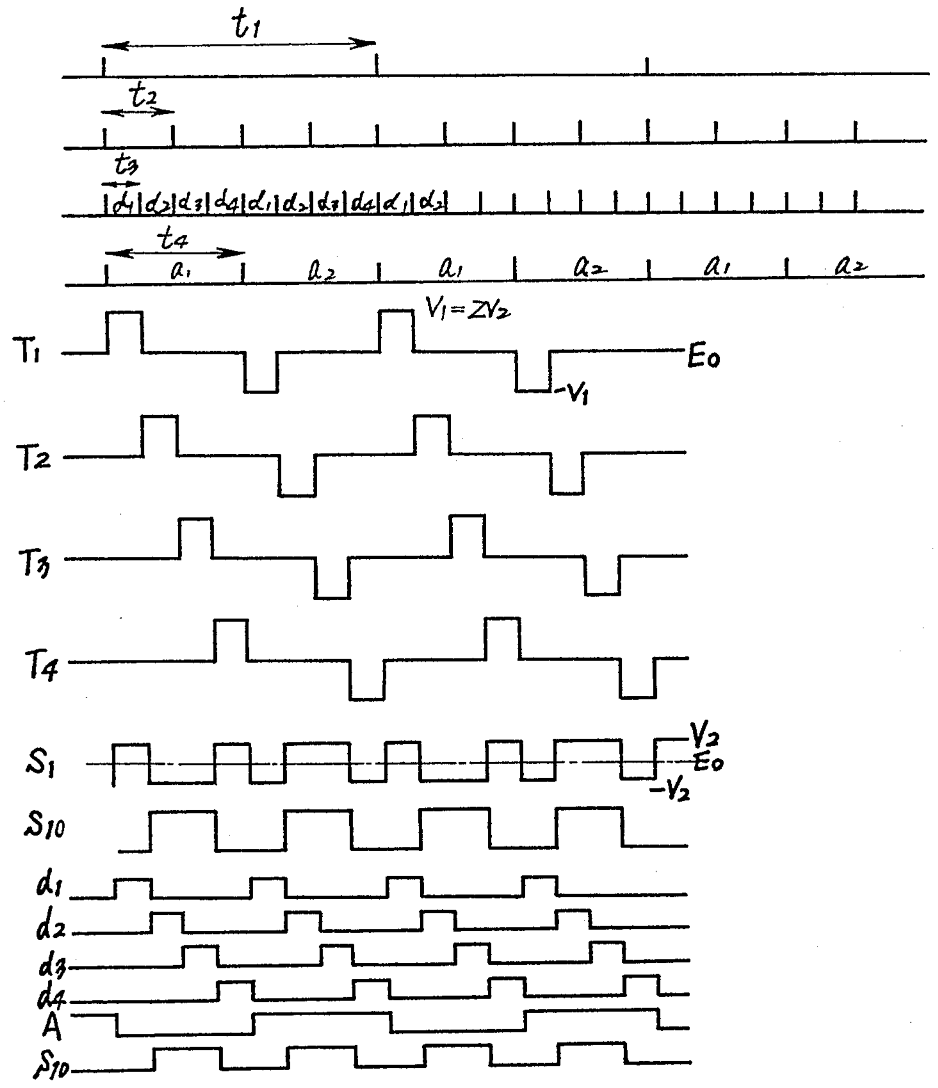
FIG. 3 is a timing chart showing a predetermined relationship among various signals in accordance with the principal concept of the present invention.

The present invention provides a system which can reduce the blinking or flickering of the visual display. Referring now to FIG. 3, in accordance with the liquid crystal driving technique of the present invention, the one-word time period $T_1$ is divided into two cycles, Viz., the first display cycle $a_1$ and the second display cycle $a_2$, as designated by $t_4$. The electrode activation signals $T_1 - T_4$ and $S_1 - S_n$ are selected so that the potential develops across both electrodes in the opposed orientation for the first cycle $a_1$ and the second cycle $a_2$ when the same contents are to be displayed. The signals $T_1 - T_4$ to the common electrodes have the time duration $t_3$ which corresponds to a half of the one-digit time period, and have a positive potential $V_1$ during the first cycle $a_1$ and a negative potential $-V_1$ during the second cycle $a_2$.

On the other hand, the signals to the segment electrodes are correlated in a predetermined relationship with the signals to the common electrodes in a manner to enable amplitude control in the positive orientation within the first cycle $a_1$. The signals to the segment electrodes are representative of information for the display unit $D_1$ during the time slot $d_1$, for the display unit $D_2$ during the time slot $d_2$, for the display unit $D_3$ during the time slot $d_3$ and for the display unit $D_4$ during the time slot $d_4$. In addition, the segment signals are correlated with the signals to the common electrodes in a manner to enable amplitude control in a negative orientation within the following cycle $a_2$.

With such an established relationship between the signals to both electrodes, the amplitude is increased to $|3V_2|$ when the Liquid crystal is to be in the light scattering stage but increased only to $|V_2|$ when the same is not to be in the light scattering state, for the first display cycle $a_1$. Namely, the voltage at the common electrode site becomes positive with reference to that at the segment electrode site at all times for the first display cycle $a_1$. Within the following display cycle $a_2$, the amplitude raises to $|3V_2|$ when the liquid crystal is to be in the light scattering state and declines to $|V_2|$ when the conversion to the light scattering state is not required. Therefore, the voltage developing at the segment electrode site is positive with respect to that at the common electrode site. Comparison of the earlier filed U.S. Pat. No. 3,898,646 and the present system shows that the difference is that the application of the alternating voltage is inverted in orientation each time the one-digit period $t_2$ runs out as shown in FIG. 2 in the former system, whereas in the present invention the inversion of orientation occurs each time half of the one-word time $t_4$ period $t_1$ as shown in FIG. 3 in the present system.

In application of the liquid crystal driving technique or concept of the present invention as shown in FIG. 3 to the example of the segment signals $S_1$ as shown in FIG. 2, namely, when only the display units $D_2$ and $D_3$ are desired to become operative, $-V_2$ and $V_2$ should be supplied across the liquid crystal at the time slots $d_2$ and $d_3$ and the time slots $d_1$ and $d_4$, respectively, within the first display cycle $a_1$, and $V_2$ and $-V_2$ should be supplied at the time slots $d_2$ and $d_3$ and the time slots $d_1$ and $d_4$ respectively within the second display cycle $a_2$.

As contrasted to the earlier filed approach wherein the scattering of light around the segment electrodes does not occur during the consecutive time durations $t_1 - t_2$, pursuant to the present system the time duration in which the scattering of light does not occur is represented as $\frac{1}{2} t_1 - \frac{1}{2} t_2 = t_1 - t_2/2$ and thus corresponds to half of that in the earlier filed approach. It means that the frequency of the light scattering increases and thus the degree of the light flickering or blinking decreases. The display cycle is defined as the time duration in which all of the display units $D_1 - D_4$ are activated once. In addition, the present system overcomes the disadvantage of the prior system that the possibility of occurring a blinking display becomes greater in the case where the digit number of the display system is large and the repeating period for the scattering of light is correspondingly long.

Figure 4:
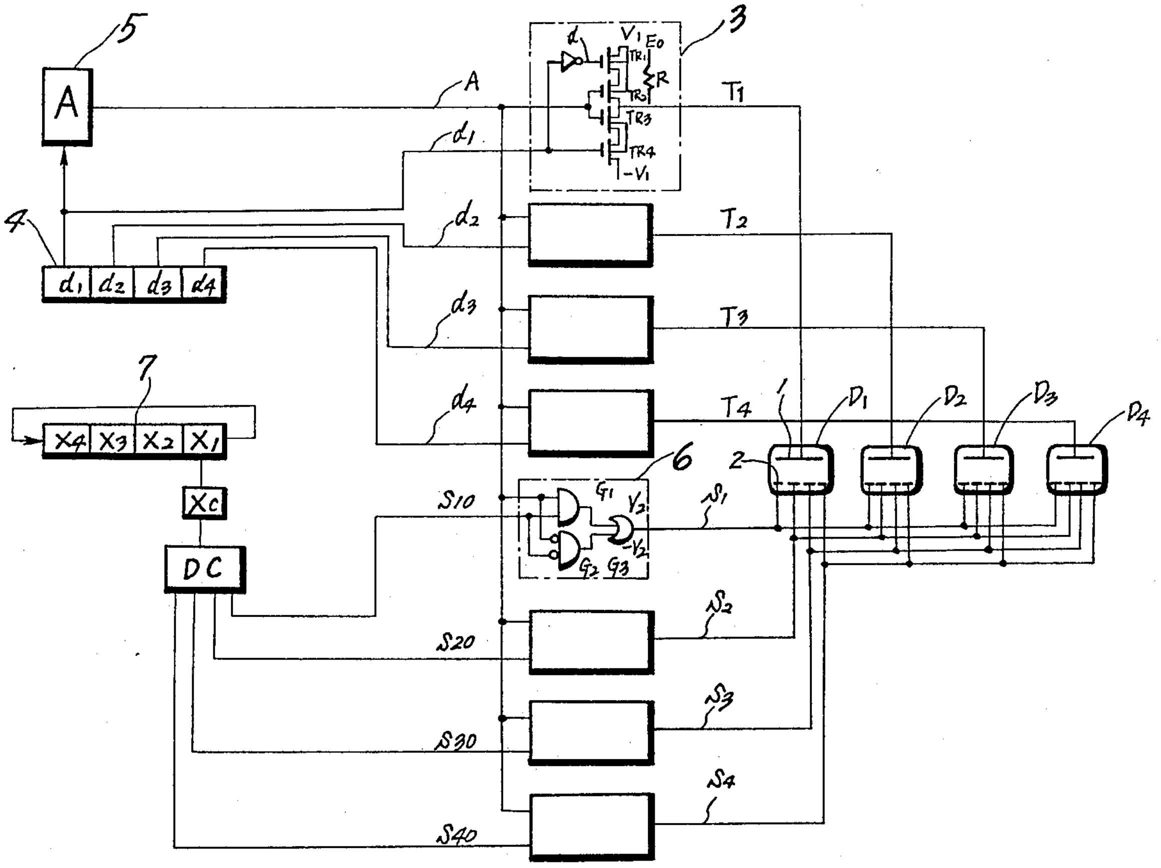
FIG. 4 is a more detailed circuit diagram showing one preferred embodiment in accordance with the present invention.

FIG. 4 is a partially detailed circuit diagram showing one preferred embodiment which practices the application of the signals to the electrodes as briefly discussed with reference to FIG. 3.

The generation of the signals $T_1 - T_4$ to be applied to the common electrodes 1 of the respective liquid crystal display units $D_1 - D_4$ is derived from common electrode signal generators 3 of which the circuit constructions are substantially identical except that they receive different input signals $d_1 - d_4$. Typically, they are implemented with utilization of four MOS type transistors $TR_1 - TR_4$, two of the transistors $TR_1$ and $TR_2$ being of P type conductivity and the remaining two transistors $TR_3$ and $TR_4$ of N type conductivity. The first transistor $TR_1$ has the source connected to a voltage source $+V_1$, the drain connected to the source of the second transistor $TR_2$ and the gate receiving a singal A. The second transistor $TR_2$ has the drain thereof connected to the source of the third transistor $TR_3$, the crosspoint delivering the outputs. The gate of the second transistor $TR_2$ is coupled with the gate of the third transistor $TR_3$, the crosspoint being supplied with the signals $d_1 - d_4$. The substrate terminals of the transistors $TR_1$ and $TR_2$ are connected together to $V_1$.

The drain of the third transistor $TR_3$ is connected to the source of the transistor $TR_4$ of which the drain is connected to a voltage source $-V_1$ and the gate receives the signals $d_1 - d_4$. The signals $d_1 - d_4$ determine the time duration of the first and second display cycles $a_1$ and $a_2$ equal to the time duration $t_4$ as illustrated in FIG. 3. They may be derived from the output of a counter 4, for example.

The above discussed signal A serving to discriminate between the first display cycle $a_1$ and the second display cycle $a_2$, inverts in polarity for each complete sequence of a string of the signals $d_1 - d_4$, and is provided from a signal generator 5, which may be a T-type flip flop of responsive to the signal $d_1$.

The signals $d_1 - d_4$ are respectively supplied to the gates of the individual transistors, the transistors $TR_1$ and $TR_2$ of P type conductivity being conductive in response to the negative signal components and the transistors $TR_3$ and $TR_4$ of N type conductivity being conductive in response to the positive signal components.

Taking an example of the generator for the signal $T_1$ to be supplied to the display unit $D_1$, the signal $T_1$ should assume a high potential $V_1$ and a low potential $-V_1$ at the time slot $d_1$ in the first display cycle $a_1$ and at the time slot $d_1$ in the second display cycle $a_2$, respectively and assume a reference potential $Eo$ at the remaining time slots.

By applying the signal A to the gate electrodes of the transistors $TR_2$ and $TR_3$, the transistor $TR_2$ becomes conductive during the first display cycle $a_1$ wherein $A = 0$, and the other transistor $TR_3$ becomes conductive during the second display cycle $a_2$ wherein $A = 1$. The transistors $TR_1$ and $TR_4$ become conductive under the condition that $d_1 = 1$. In other words, the positive signal arrives at the gate of the transistor $TR_4$ and the negative signal through an inverter node arrives at the gate of the transistor $TR_1$.

With such an arrangement, the transistors $TR_1$ and $TR_2$ are conductive and output is $V_1$ when the conditions $A = 0$, $d = 1$ are evaluated, and conversely the transistors $TR_3$ and $TR_4$ are conductive and the output is $-V_1$ when $A = 1$ and $d = 1$. At the time slots $d_2 - d_4$ the transistors $TR_1$ and $TR_4$ are non-conductive and the reference potential $Eo$ develops across the output terminals through a resistor R regardless of the status of the signal A. The generation of the remaining signals $T_2 - T_4$ may be derived in the same manner. In this way, a string of timing signals $T_1 - T_4$ of which the application to the liquid crystal units is inverted in orientation, is obtainable from the above described circuit construction.

In the meanwhile, the generation of the segment signals $s_1 - s_4$ is derived from a segment signal generation circuit 6. The segment signals provide the potential of $-V_2$ to the corresponding segment electrodes desired to produce the scattering of light for the first display cycle $a_1$, viz., A = 0 and provide the negative potential $V_2$ to the corresponding segment electrodes desired to provide the scattering of light for the second display cycle $a_2$, viz., A = 1.

The circuit implementation includes AND gates $G_1$, $G_2$ and an OR gate $G_3$ which receive as these inputs and signals A and $S_{10} - S_{40}$. The last named signals $S_{10} - S_{40}$ correspond to the individual electrodes and assume 1 when the scattering of light is required and 0 when the scattering of light is not required. A register 7 having a capacity corresponding to the digit number of the display system circulates the contents thereof in synchronization with the phases of the signals $d_1 - d_4$ and delivers the output from the last digit position $X_1$.

The first digit portion, second digit portion, third digit portion and fourth digit portion of information are respectively derived from the last digit stage $X_1$ at the successive time slots $d_1$, $d_2$, $d_3$ and $d_4$. Since the information is represented in a binary coded decimal notation and the output from the last digit stage $X_1$ changes bit by bit, one block or one-digit area of the information is temporarily stored in a buffer $X_C$. Provision of a decoder DC is established for converting the binary-coded decimal signals into the segmented representation signals $S_{10} - S_{40}$ for the display system. The output level from the OR gate is $V_2$ when the output is 1 and $-V_2$ when the output is 0.

The gate $G_1$ as the input the signal A and the segment signals $S_{10} - S_{40}$, whereas the gate $G_2$ receives as the input the inversion of the signal A and the inversion of the segment signals $S_{10} - S_{40}$. Namely, the gate $G_2$ is opened during the first display cycle $a_1$ wherein A = 0, with the results that the inverted signals $S_{10} - S_{40}$ is provided so that the gate $G_3$ develops $-V_2$ if the signal is 1 and $V_2$ if the signal is 0. Since the gate $G_1$ is opened and the signals $S_{10} - S_{40}$ are produced during the first display cycle $a_2$ wherein A = 1, the output of the gate $G_3$ is $V_2$ if the signals $S_{10} - S_{40}$ are 1 and $-V_2$ if the signals $S_{10} - S_{40}$ are 0.

For example, considering the above mentioned example in which the application of the signal $S_1$ shown in FIG. 3 causes the display units $D_2$ and $D_3$ to scatter light, the segment signal $S_{10}$ should be 1 during the time slots $d_2$ and $d_3$ and 0 during the time slots $d_1$ and $d_4$. The situations A = 0 and $S_{10}$ = 0 at the time slot $d_1$ within the first display cycle $a_1$ follow that the gate $G_2$ is opened to produce the output 1 and the gate $G_3$ delivers the output $V_2$.

At the succeeding time slot $d_2$ the situations A = 0 and $S_{10}$ = 1 does not force the gates $G_2$ and $G_3$ into the opened state so that the gate $G_3$ creates the output of $-V_2$. The same environment is seen at the next time slot $d_3$ and, as a result, the gate $G_3$ continues to create the output of $-V_2$. Afterward, the output of the gate $G_3$ raises to $V_2$ since no difference in the situations is evaluated between the time slots $d_4$ and $d_1$.

Within the second display cycle $a_2$, the gates $G_3$ and $G_4$ are not opened at the time slot $d_1$ and the output of the gate $G_3$ is held at the negative level $-V_2$ at the time slot $d_1$ because of A = 1 and $S_{10}$ = 0. Then, the gate $G_1$ is opened and the output is 1 and the output of the gate $G_3$ is $V_2$ at the time slots $d_2$ and $d_3$ because of A = 1 and $S_{10}$ = 1. The situations at the time slot $d_4$ are equal to that at the time slot $d_4$ so that the output is $-V_2$.

Although the segment selection signals are supplied from the register 7 via the buffer register XC and the decoder DC in the foregoing description, an additional register may be provided for storing in a static made the contents of the register 7 and then the contents of the additional register may be transferred to the display system digit by digit is synchronization with the digit selection signals. In this instance the speed of displaying may be determined regardless of the circulating rate of the arithmetic register 7.

The invention being thus described, it will be obvious that the same may be varied in many ways. Such variations are not to be regarded as a departure from the spirit and scope of the invention, and all such modifications are intended to be included within the scope of the following claims.

We claim:

1. A liquid crystal display system comprising:

a plurality of liquid crystal display units for conjointly displaying a selected word in a predetermined word time period in response to display information signals applied to each display unit and representative of said selected word, said word time period being equal to the sum of the periods of first and second display cycles, said periods of each of said display cycles being equal to the time of one application of said display informaton signals to each of said display units, the optical characteristics of said display units changing state in response to the application of display information signals having voltages in excess of a predetermined threshold level;

means for generating said display information signals including, alternating voltage generating means for continuously applying an alternating voltage to said display units throughout the entire word time period, the voltages of said display information signals varying as a function of the amplitude of said alternating voltage, and means generating timing signals for causing said amplitude to exceed said threshold levels at selected times within said display cycles in accordance with the word to be displayed; and means for constraining said alternating voltage to a fist polarity in said first display cycle and to a second opposite polarity during a second display cycle.

2. A liquid crystal display system as set forth in claim 1 wherein each of the liquid crystal display units has a pair of electrode means and a liquid crystal composition sandwiched between the electrodes.

3. A liquid crystal display system as set forth in claim 2 wherein the pair of the electrode means comprises a common electrode and a plurality of segment electrodes.

4. A liquid crystal display system as set forth in claim 1 further comprising means for producing a discrimination signal to facilitate discrimination between the first display cycle and the second display cycle.

5. The liquid crystal display system as set forth in claim 1 wherein each of said display units includes a common electrode, a plurality of segment electrodes, and a liquid crystal composition sandwiched between said common electrode and said segment electrodes means for applying said timing signals to the common electrode of each display unit, an information register containing display information representative of a word to be displayed, and segment signal generator means connected between the segment electrodes and said information register, the amplitude of said alternating voltage being a function of both the voltage magnitude and phase relationship between said timing signals and said segment signals.

* * * * *